United States Patent [19]

Chambon

[11] 4,179,041

[45] Dec. 18, 1979

[54] METHOD OF AN APPARATUS FOR EXTRACTING, MEASURING AND ADDING A PRODUCT

[76] Inventor: René Chambon, Chemin de la Pene, 65 310 Odos, France

[21] Appl. No.: 817,087

[22] Filed: Jul. 18, 1977

[30] Foreign Application Priority Data

Jul. 16, 1976 [FR] France .................................. 76 22461
Nov. 10, 1976 [FR] France .................................. 76 34543
May 13, 1977 [FR] France .................................. 77 15469

[51] Int. Cl.² ................................................ B65B 1/04
[52] U.S. Cl. ........................................ 222/1; 222/145; 222/361; 141/392; 366/348
[58] Field of Search ............... 222/361, 1, 145; 141/2, 141/1, 3-12, 71-80, 250-284, 392; 366/348, 349

[56] References Cited

U.S. PATENT DOCUMENTS 1,343,924  6/1920  McCorkle ............................ 222/361

Primary Examiner—Houston S. Bell
Attorney, Agent, or Firm—James C. Wray

[57] ABSTRACT

To extract and measure out a product from a bulk stock and adding said product inside a hopper use is made of at least three perforated surfaces or plates superimposed on one another and in contact with one another so that the product to be extracted is trapped in the hole(s) in the center plate between the top plate and the bottom plate by a relative movement of the top plate in relation to the two other plates then stationary in relation to each other and the product so trapped in the hole(s) in the center plate is extracted to the outside by a relative movement of the center plate in relation to the top plate and the bottom plate, then stationary in relation to each other, or by a relative movement of the bottom plate in relation to the center plate and the top plate.

The addition and mixing of the additive so extracted with a product contained in a hopper, which products may be a pigment and a plastic in granules in a hopper, is effected by making a cavity in the bulk of the product contained in the hopper in an area close to its delivery nozzle and by pouring through the bulk of said product, from one or several distributors controlled by the device fed by the hopper, the additive(s) into the cavity for mixing there, which avoids dirtying the whole of the hopper and makes better and more proportionally accurate mixing possible.

The invention is particularly useful when small grain or powdered products have to be measured, as is particularly the case in the plastics processing industry.

15 Claims, 34 Drawing Figures

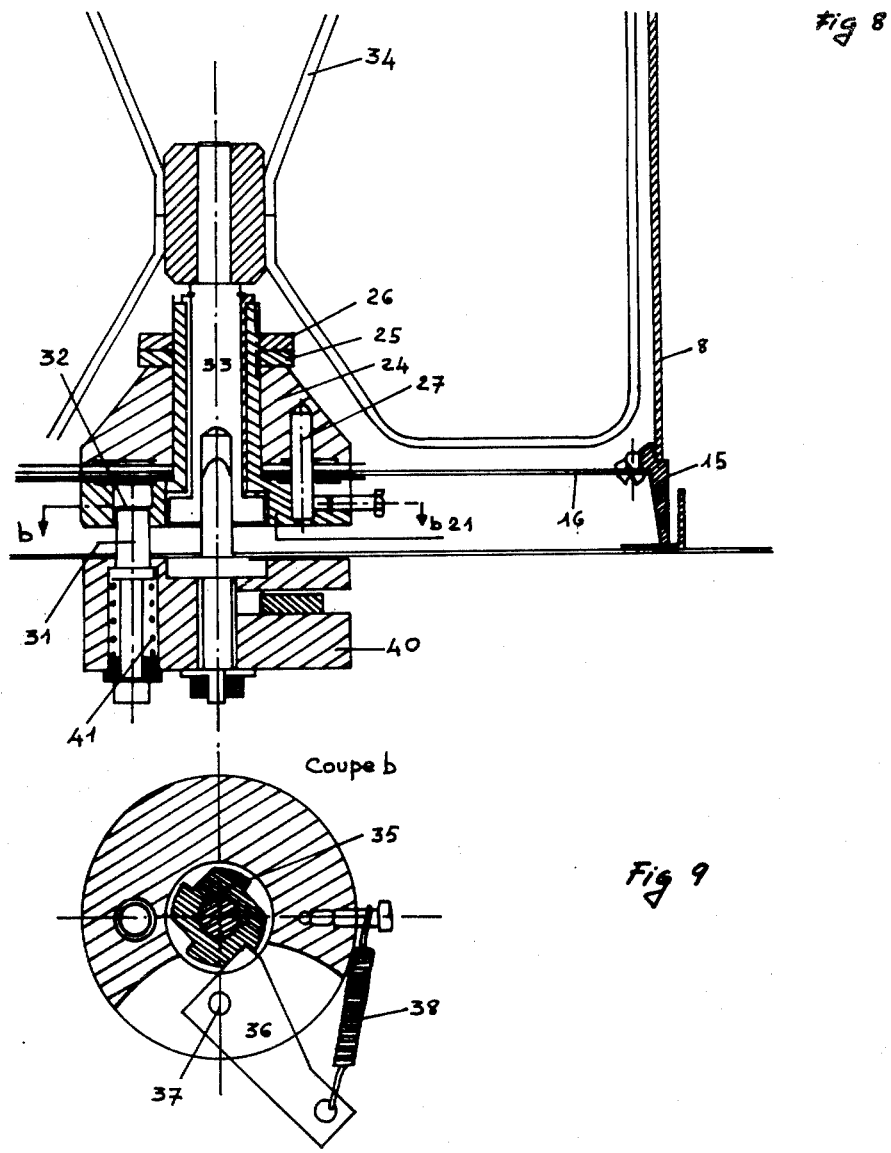

coupe CC

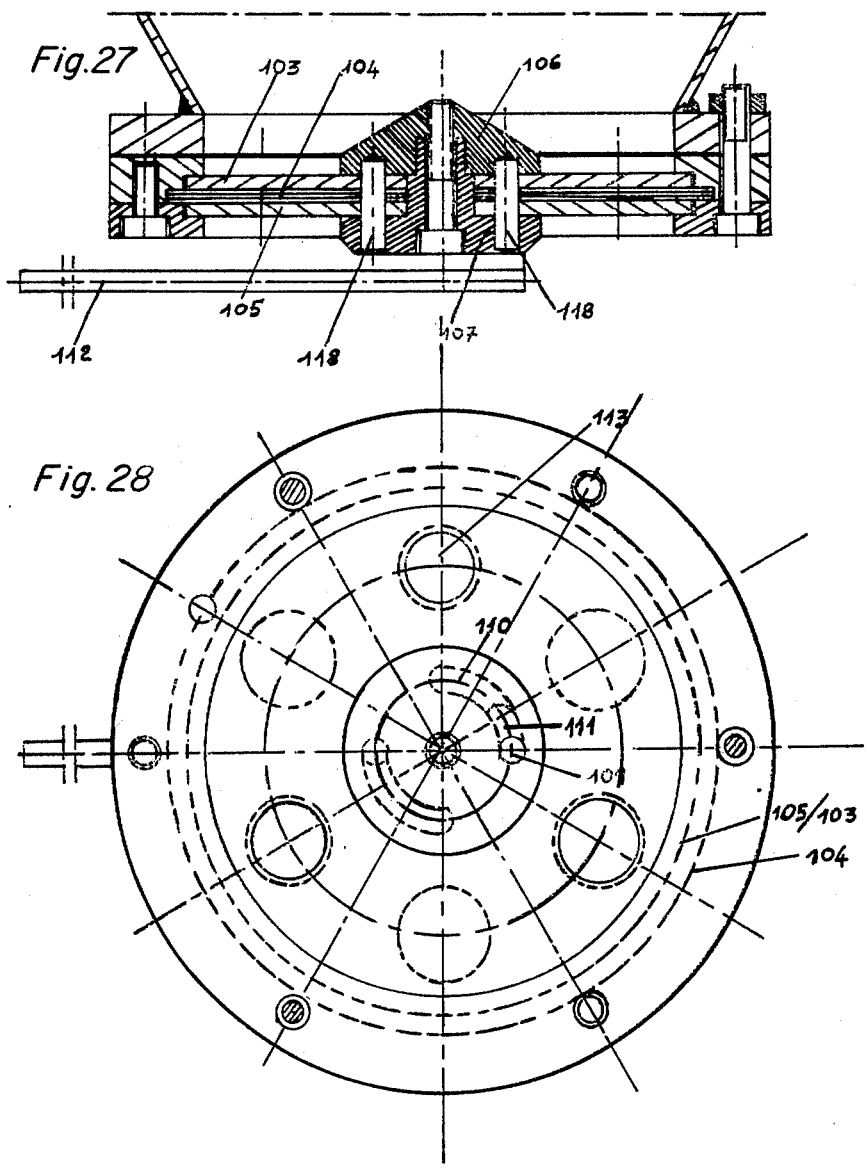

METHOD OF AN APPARATUS FOR EXTRACTING, MEASURING AND ADDING A PRODUCT

BACKGROUND OF THE INVENTION

The subject matter of the present invention is a method of extracting and measuring a product from a bulk stock.

The present invention also relates to a method of adding one or several additives, extracted from a bulk stock, to a product contained in a hopper which feeds some sort of processing or distributing device, as well as the devices for putting it into effect.

It is essential in industry to be able to obtain delivery of quantities of products in accordance with a regular, pre-determined cycle. This is particularly the case in the plastics processing industry, where small grain or powdered additives have to be added to the basic material in very small quantities; said additives may, for example, be colouring pigments.

For this purpose, methods and devices have been recommended which make use of superimposed perforated surfaces working on the lock-gate principle with a measuring lock which fills and empties according to the relative movements of said surfaces.

However, the devices made up to now have not made it possible to obtain regularly the measurement and extraction of constant quantities of product, notably in the case of very small quantities of certain powdered or granulated products. The main difficulty encountered in this type of operation lies in obtaining a regular cycle of additions and constant proportions, which avoids constant monitoring of distribution or product processing equipment as well as handling and trial-and-error settings, which are a source of manufacturing rejects.

Another difficulty encountered in this type of operation relates to the nature and structure of the products or additives to be measured and added to the basic product.

In fact, these additives are delivered into the processing machine or its feed hopper and in some cases these products, notably powdered pigments for colouring plastics, cause considerable soiling, therefore the equipment has to be cleaned frequently and particularly every time a product different from the previous one is to be processed therein or an additive different from and unsuitable to coexist with the previous one is to be used.

Moreover, these powdered products have a tendency to lump and clog the extraction aperture(s) or to slide under the extraction components, wich affects their working and causes imperfect measuring and extraction.

OBJECT OF THE INVENTION

An object of the present invention is, by the use of the moving perforated surfaces principle known in itself, to overcome these drawbacks, making it possible to extract products, notably clogging powders, from the bottom or the side of a storage container by a simple manuel or mechanised operation.

The invention has the advantage of providing a simple, light and small-sized device which is therefore particularly reliable and whose cost price is low, making it possible to use numbers of them.

The invention also has the advantage of giving a very constant flow which can be increased or decreased at will simply by changing the operating speed of the device used and by knowing in advance the ratio of speed variation to flow.

The invention also aims at providing a device which can be fitted on any processing machine and wherein one additive can be replaced by another without having to clean said machine completely.

This advantage is particularly useful in the case of the addition of colouring additives to plastics in the hopper which feeds, e.g., an injection moulding machine; in fact, by means of the invention, it is possible to go from one colour to another very easily on the same machine.

However, the invention is not confined to this particular use, which is given as an example, and it can on the contrary be used whenever quantities of products, notably powders or granules, have to be measured out and extracted.

SUMMARY OF THE INVENTION

The addition to and mixing of an additive so extracted with a product contained in a hopper, which products may be a pigment and a granulated plastic in a hopper, is done by making a cavity in the bulk of the product contained in the hopper in an area close to its delivery nozzle and by pouring through the bulk of said product, from one or several distributors controlled by the device fed by the hopper, the additive(s) into the cavity for mixing there, which avoids dirtying the whole of the hopper and makes better and proportionally accurate mixing possible.

The device for applying the method according to the invention is essentially characterised in that it comprises:
- at least one extraction and measuring device using perforated surfaces or plates which are superimposed and in contact with one another, said plates being driven in relative movement to one another to measure out and extract the product and said extraction device being equipped with means of controlling it by the processing machine and being positioned above the hopper,
- a main duct into which the extracted additive(s) are poured, said duct inside the hopper giving into the area of the delivery nozzle thereof,
- an end-piece, preferably in the shape of a truncated cone; integral with the end of the duct in the hopper and designed to constitute a mixing chamber and by cooperation with the delivery nozzle of the hopper to centre the end-piece
- a possible component for stirring the product and the additives.

The device for extracting and measuring out products using surfaces in relative movement in relation to the bulk stock, one at least of which is perforated, is essentially characterised in that it includes a fixed centre surface with at least one perforation, a mobile bottom surface alternately blocking said perforation and two mobile top surfaces over the centre surface alternating one after the other then one towards the other so as to assemble and compact a volume of product, said volume being released by the movement of the bottom surface which moves away from the perforation.

Other characteristics and advantages of the invention will emerge from a reading of the following description of forms of embodiment given as non-limiting examples and illustrated by the attached drawings, wherein:

BRIEF DESCRIPTION OF DRAWINGS

FIGS. 8 to 14 show views of the installation according to FIGS. 6 and 7 and of the measurement and extraction device which it includes;

FIGS. 27 to 33 show other, simplified forms of embodiment of the extraction and measuring device according to the invention.

DESCRIPTION OF PREFERRED EMBODIMENT

Figure 1:
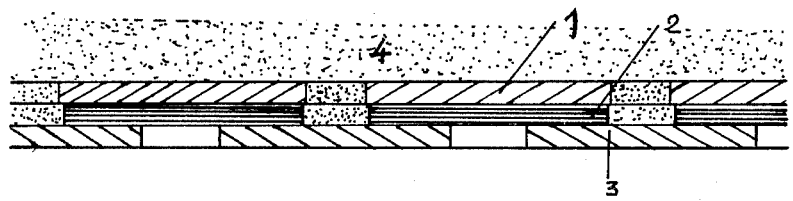
FIGS. 1 to 5 show diagrammatic sectional views of a means of putting the extraction method according to the invention into practice.

As illustrated in FIGS. 1 to 5, the method of extracting, measuring out and adding products from a bulk stock according to the invention uses three perforated surfaces or plates referenced 1, 2 and 3 superimposed one above the other and in contact with one another, said plates or surfaces being driven in relative movement one to another so that the product 4 to be extracted is trapped in the hole(s) in the centre plate 2 between the top plate 1 and the bottom plate 3 by a relative movement of the top plate 1 in relation to the other two plates, then stationary or in movement in relation to each other and the product so trapped in the hole(s) in the centre plate 2 is extracted to the outside by a relative movement of the centre plate in relation to the top plate and the bottom plate, then stationary or in movement in relation to each other or by a relative movement of the bottom plate in relation to the centre plate, then stationary.

FIG. 1 shows top plate 1, centre plate 2 and bottom plate 3 in a particular choice of relative movements at the moment when the perforations in 1 and 2 correspond and when plate 3 is at its utmost limit of movement in relation to plate 2 towards the right.

The perforations may be circular and advantageously of slightly increasing diameter from 1 to 3.

In each plate the perforations are separated from one another by at least 4 times the diameter of the largest perforations in plate 3 so that the system can work like an actual lock-gate for very fluid powdered products. It is useful, for clogging powdered products, for the diameter of each perforation to be large in relation to the thickness of the plate. It will be useful to use thin plates, notably in the case of plate 2, whenever it is wished, at the same time as the extraction, to reduce the aggregates.

Figure 2:
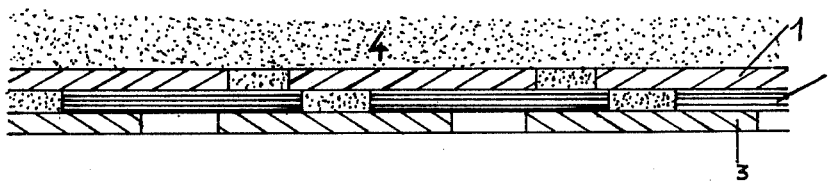

FIG. 2 shows the three plates at the moment when top plate 1 has completed a travel equal to the diameter of a perforation in plate 3 towards the left of plate 2 while plates 2 and 3 have remained stationary in relation to each other.

This movement has trapped the product 4 in the perforations in plate 2 between plates 1 and 3.

Figure 3:
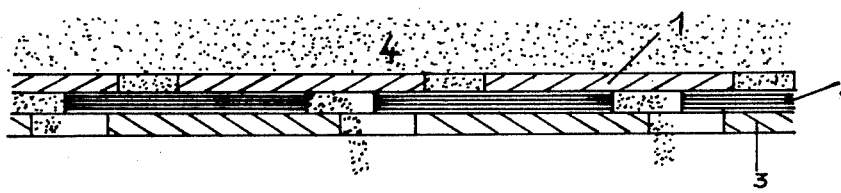

FIG. 3 shows the three plates at a moment when plates 1 and 3 are simultaneously making a movement to the left in relation to plate 2. As shown, as soon as the holes in plate 3 meet the holes in plate 2, the trapped product, as described above, falls to the outside by gravity. The relative movements of plate 2 in relation to plates 1 and 3 detach by scraping clogged powdered product at the top and bottom.

Figure 4:
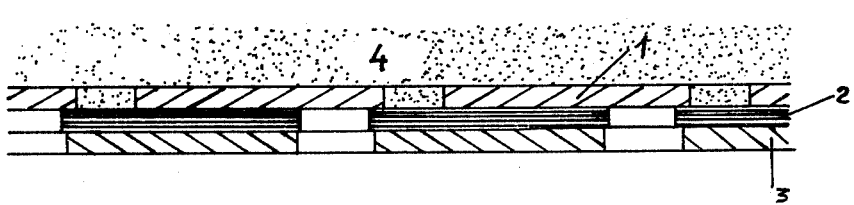

FIG. 4 shows the three plates when the movement described above is complete. The holes in plates 2 and 3 are then substantially in correspondence after a movement equal to twice the diameter of the perforations in plate 3.

Figure 5:
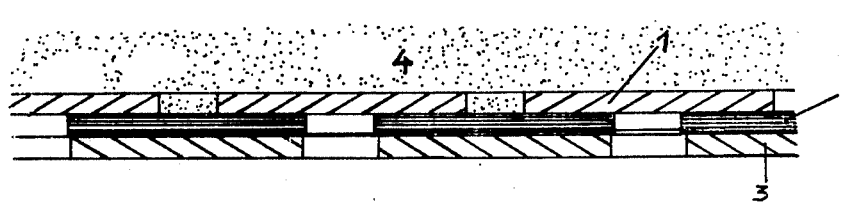

FIG. 5 shows the three plates at the moment when top plate 1 has completed a movement to the right in relation to plate 2 equal to the diameter of a perforation in plate 3 while plates 2 and 3 have remained stationary in relation to each other. The three plates will then return to the configuration in FIG. 1 by a simultaneous movement to the right by plates 1 and 3 equal to twice the diameter of a perforation in 3.

It can be appreciated that it is easy to adjust the flow by varying the speed of the movements or by longer or shorter stoppages, e.g. at the end of the cycle. Experiments show that this system achieves very great uniformity of measuring out.

The method of adding the product extracted using perforated surfaces such as described above from a bulk stock to a product contained in a hopper 5 feeding through its delivery nozzle 6 a machine 7 for processing said product, e.g. a plastic injection moulding machine, consists essentially of making a cavity in the mass of product 4 in an area close to the delivery nozzle of the hopper and of pouring the additive(s) by gravity through the mass of said product and from a distributor 8 controlled by machine 7 into cavity 9 where mixing is carried out.

As shown, the device for implementing the method fitted on the hopper 5 of a machine for processing a product consists essentially of an additives distributor 8 or container and a power unit 10 resting on hopper 5. A duct, preferably vertical and integral with the power unit is positioned under the additive distributor to channel said additive by gravity into the hopper through the product which it contains, to an area close to its delivery nozzle 6.

The diameter of the duct is large enough to prevent the additive from clogging said duct, irrespective of the quantity distributed.

This duct can be cylindrical or conical. An end piece 12 in the shape of a truncated cone is fixed to the end of duct 11 by radial flanges so that the basic product can pass freely between its wall and the duct.

End piece 12 is shaped to fit on to the delivery nozzle 6 of the hopper where it constitutes a chamber for mixing the product 4 and the additive.

Preferably, a seal is formed by means of a flexible material 13 between the end piece and the hopper so that the whole of the basic product is compelled to circulate in the mixing chamber.

A mixer 14 connected to the power unit 10 is rotated in end piece 12.

The additive is distributed inside end piece 12 to the end thereof forming the cavity in order to be drawn along by and mixed with the basic product.

The distributor is a container or bucket fitted with a handle with which to hold it in order to place it on power unit 10 fitted with a device for extracting and measuring out the additive which it contains, said device coming above duct 11.

The base of the container is fitted with a mounting 15 which separates its bottom from the frame of power unit 10.

The distributor's extraction device is a lock-gate of the type with moving surfaces such as defined above and shown in FIGS. 8 to 12, one of whose surfaces constitutes the bottom 16 of the distributor to which it is fixed with screws in such a way as to enable it to be replaced in order to obtain devices with different performance ranges.

Figure 11:
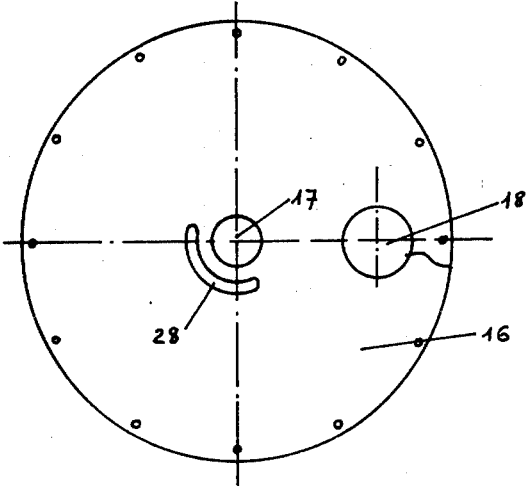
Figure 12:
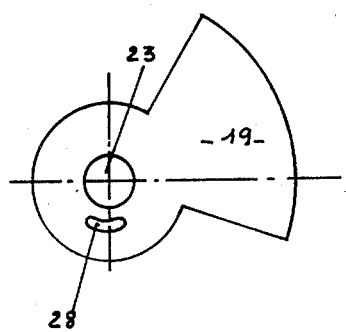
Figure 13:
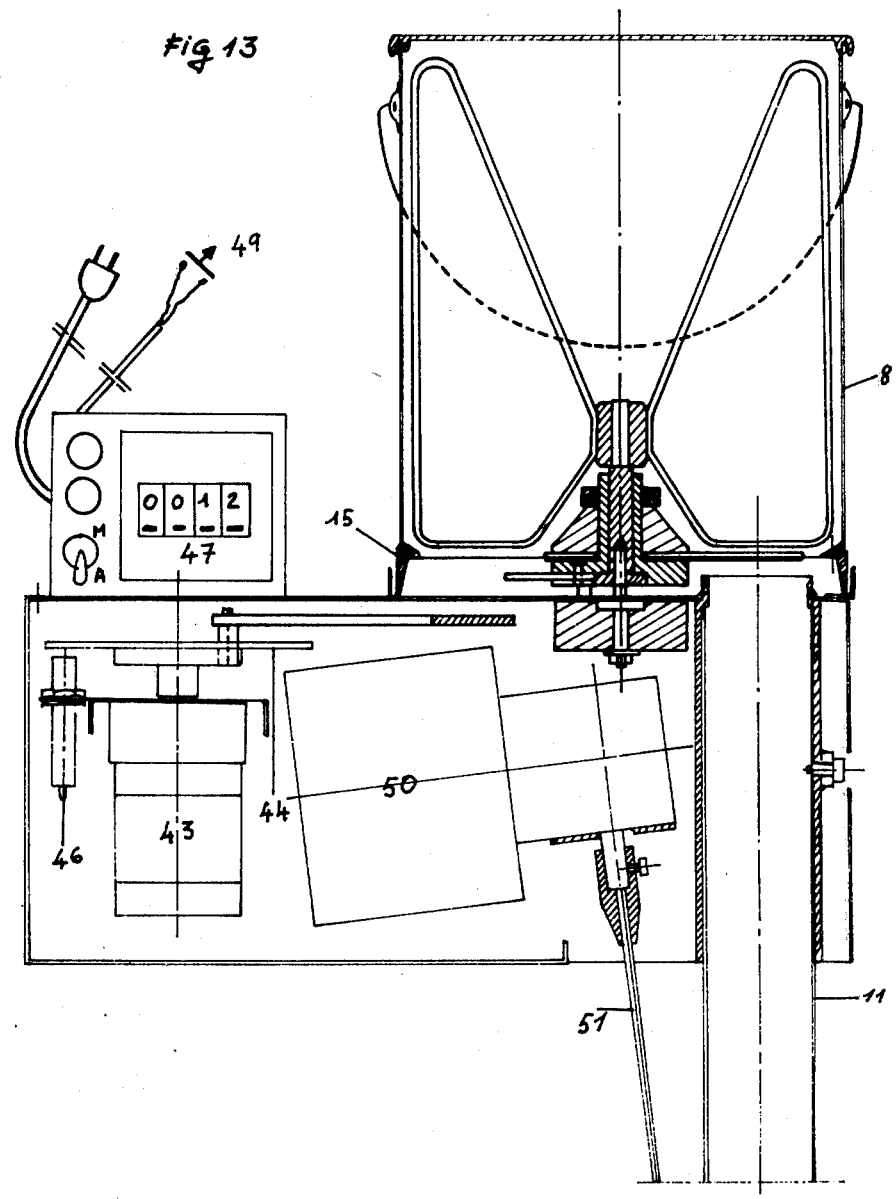

As shown in FIG. 11, the bottom 16 of the distributor has a centre hole 17 and a side hole 18. On either side of the bottom 16 there are two moving plates 19 and 20 mounted on the same hub 21 passing through their centre holes 22 and 23 and through the centre hole 17 in bottom 16 and held by a top hub 24 fitted on to the aforementioned one and fixed with a nut 25 and lock-nut 26 cooperating with the thread of hub 21.

A stud 27 transversal to the hubs holds them together in motion by cooperating with the apertures 28 in each of plates 16, 19 and 20 and transmits to plates 19 and 20 the different degrees of hub movements.

Because of the different sizes of the apertures in plate 20 and the one in plate 19, it can be understood that plate 20 which covers hole 18 in bottom 16 will be operated before plate 19.

Top plate 20 has an arm 29 which has a slant 30 (section AA FIG. 10) and when it rotates it packs a dose of the product from the distributor in the hole in centre plate or bottom 16 closed by bottom plate 19 which by cooperation between stud 17 and its aperture 28 rotates to release the product while plate 21 closes the hole in the centre plate.

Centre plate 16 as shown is thin, more particularly suited to the extraction of clogging powdered products; however, this plate being removable and since the play between the hubs can be adjusted by means of nut 25 and lock-nut 26, it is possible to replace it with a thicker plate for extraction of granular or pasty or non-clogging powdered products, i.e., which cannot stick to the sides of its hole.

The purpose of the slant 30 on arm 29 is to compress the powdered additive in the hole or alveole in plate 16 in order to minimize the differences in the quantity of additive extracted during each phase since some powdered products compact to a greater or lesser degree and their apparent density varies.

It has been found during tests carried out that some compression of the additive by the slant 30 gave good evenness of extraction.

Hubs 21 and 24 receive an alternating rotary movement through a stud 31 which, when the distributor is positioned on the power unit, is housed in a hollow 32 in hub 21.

A drive shaft 33 is mounted rotatingly in hub 21 where it is held by a flexible ring; it carries the flails 34 for stirring the product.

Its base is formed into a toothed wheel 35 which cooperates with a pawl 36 articulated on an axis 37 and with a return spring 38. The alternating motion of hubs 21 and 24, whose amplitude is greater than the angle formed by two of the teeth on wheel 35, communicates thereto a rotary movement, always in the same direction, which drives the stirring flail 34. The flail is thus driven in a movement designed to bring the powdered product back over the hole.

The base of shaft 33 has an axial hollow in which, when the distributor is put in position, axle 39 integral with the frame of the power unit is housed, said axle being the axis of rotation of part 40 carrying stud 31 which provides alternating rotation of hubs 21 and 14, said axle 39 also serving to centre the hubs.

Stud 31 is mounted on a spring 41 in part 40 which enables it to house itself of its own accord in hole 32 in hub 21 during rotation.

Figure 14:
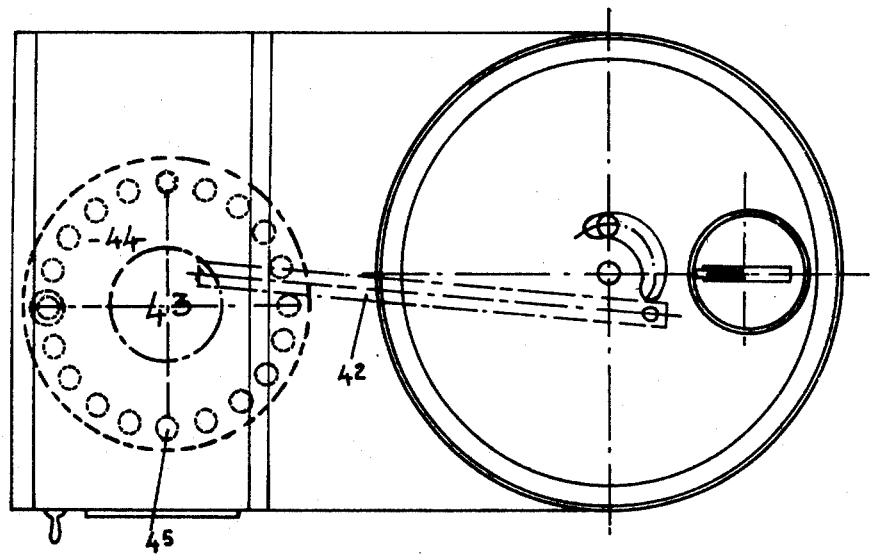
Figure 15:
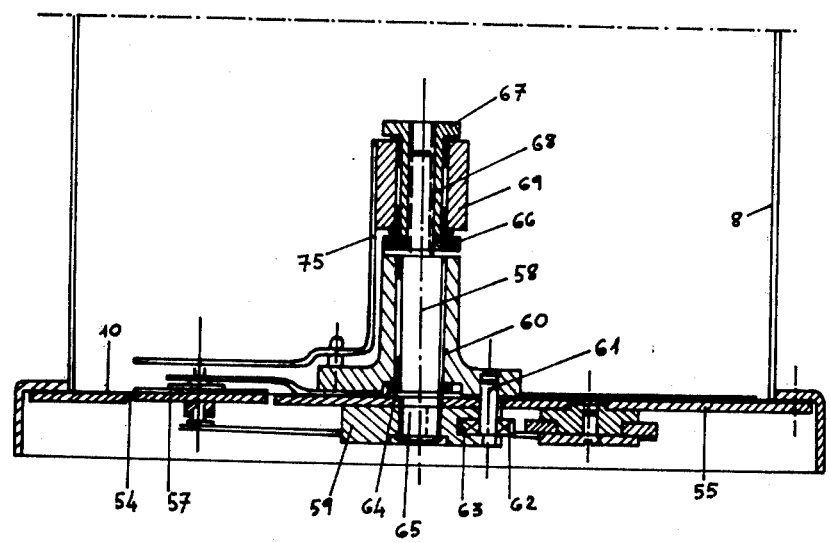
FIGS. 15 to 26 show a product extraction and measuring device in accordance with another forme of embodiment as included in the installation according to FIGS. 6 and 7.
Figure 16:
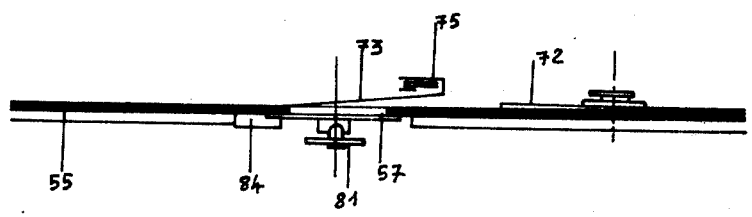
Figure 17:
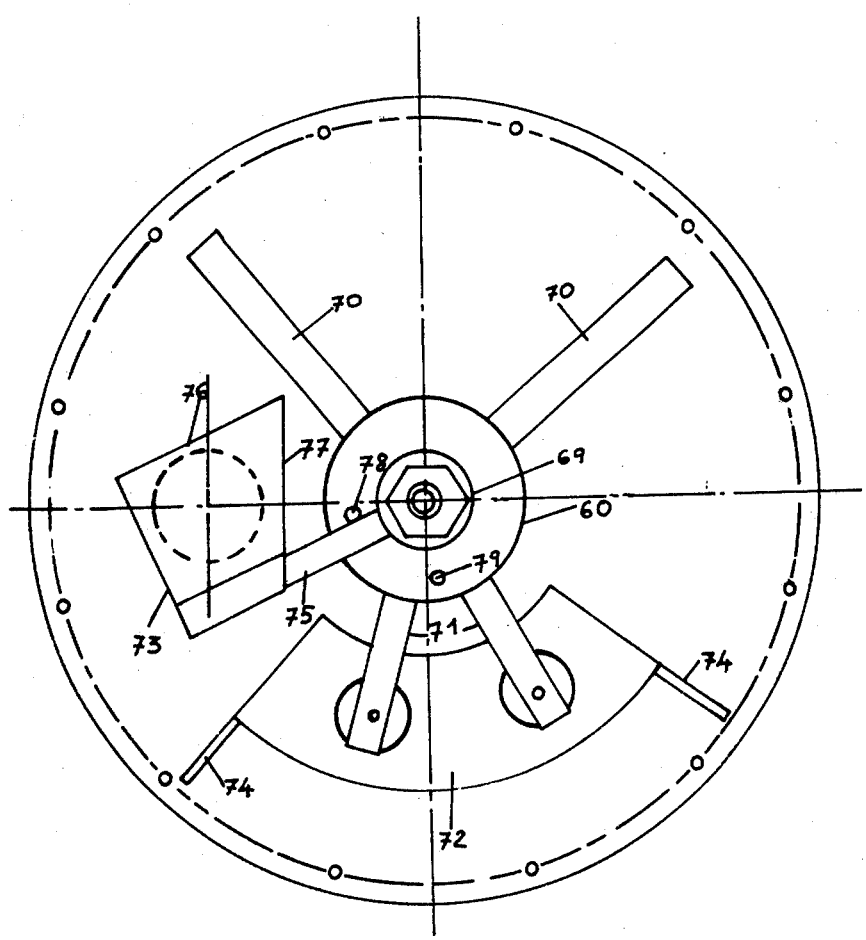

Part 40 mounted rotatingly on axle 39 cooperates with push-rod 42 (FIG. 14) operated by a gear motor 43 fixed to the frame of the power unit. A metal disc 44 with a succession of holes 45 around its perimeter is mounted on the shaft of the gear motor 43.

Holes 45 pass one after the other over an inductive detector 46 which, every time a hole passes, sends an electric pulse to a counter 47.

Counter 47 counts these pulses starting from an external pulse emitted by a contact such as 49 which closes for a brief moment, e.g. at each moulding cycle when the product processing device is an injection moulding machine or at each turn of the screw when the device is a continuous-flow extruder. When the number of pulses emitted by the inductive detector starting from the initial external pulse from contact 49 reaches the number of pulses pre-displayed on counter 47 (here 12), the latter stops the gear motor 43 and thus the working of the lock-gate. This arrangement of the invention makes it possible to obtain very accurate measurement of the additive delivered in terms of the quantity of product used.

Gear motor 50 operates mixer 14 by means of shaft 51.

Figure 7:
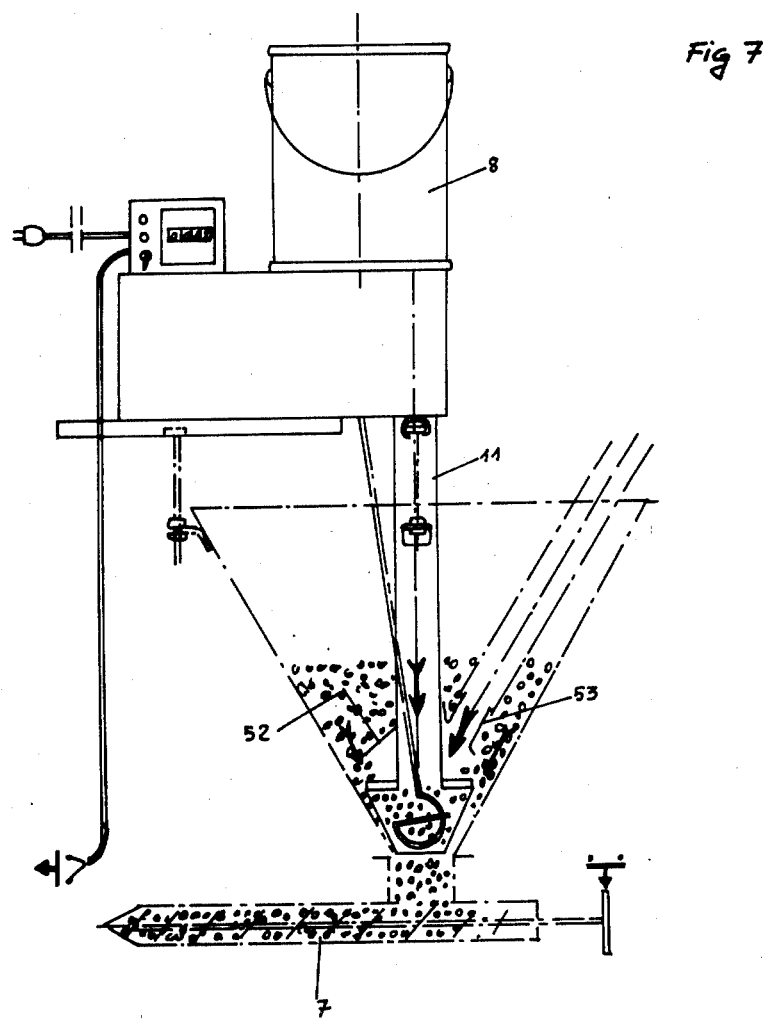
Figure 10:
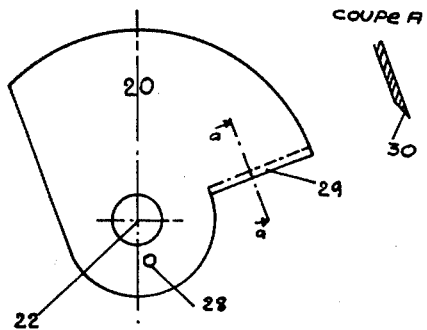

According to another form of embodiment of the invention shown in FIG. 7, duct 11 is fitted, above truncate end piece 12, with a radial flange 52, preferably slanting, fixed by any suitable means and in such a way that its height can be adjusted. Flange 52 has the effect of increasing the volume of cavity 9 close to delivery nozzle 6 and separating the product 4 which comes down by gravity and which, if it consists of not-very-fluid granules, cannot rise inside the cavity, which makes it possible to house one or several additional additive intakes there, which will be carried along after mixing.

For this purpose, the flange receives one or several flexible or rigid ducts 53 fed by one or several secondary distributors controlled by the processing machine by idential means. For example, the secondary distributor could be a hopper with an endless screw controlled by a gear motor with disc and inductive detector as described above.

This arrangement of the invention is particularly advantageous in the case of plastic processing since it makes it possible to add re-crushed material from injection cores and faulty parts.

A preferred form of the devide for extracting and measuring out products as used in the installation described above is shown in FIGS. 15 to 20.

The bottom of bucket 8 carries the extraction and measuring components. The bucket is closed by a thin metal surface or wall called centre surface 16 which has a hole 54. The thickness of wall 16 depends on the type of product to be extracted and can e.g. be less than or equal to 1 millimeter for powders and perforation 54 can have a diameter of, e.g., 30 millimeters.

The centre surface or wall 16 is carried by a plate 55 which is of the same shape and thicker.

Opposite the perforation, plate 55 has a recess 56 (FIG. 18) made e.g. by milling to allow free movement of the bottom surface 57 or cover closing perforation 54 in centre surface 16. The shape of said recess follows that of the curve in an arc of a circle of cover 57.

The plate receives the components operating the device and makes it possible to prevent their movements from affecting the perfect flatness of the centre surface by deforming it, which could cause irregular measuring out and extraction. For simplicity's sake, however, plate 55 could also be substantially semi-circular and not support the perforation area of the centre surface or plate.

On plate 55, a shaft 58 is fixed, e.g. by rivets or welding, which at the bottom receives a hub 59 rotating under the plate and at the top another hub 60 rotating over the plate.

An axle 61 holds hubs 59 and 60 together rotatingly; said axle, which is eccentric in relation to shaft 58, cooperates with an aperture, not shown, in plate 55 and in centre surface 16.

The end of axle 61 underneath the plate carries a freely rotating component 62, e.g. a ball bearing, part of whose circumference is housed in a hollow 63 in hub 59 and the other part of which projects externally.

Hub 60 cooperates with a ring 64 resting on an annular shoulder 65 of shaft 58 and it is held by a nut 66 itself held by a lock-nut 67 which has a smooth cylindrical part 68.

On the smooth part 68 of lock-nut 67 a hub 69 is mounted to rotate freely. Two radial scraper arms 70 are fixed to hub 60, which touch the centre surface (FIG. 3) as well as two radial, angularly staggered pressure arms 71. Pressure arms 71 are preferably flexible, e.g. made of spring steel.

One of the top surfaces or covers 72 is fixed to the end of the pressure arms 71 so that said arms apply it to the centre surface.

Cover 72 is shaped in an arc of a circle and is preferably made of a thin, flexible material, e.g. steel some 3/10 to 1 millimeter thick in order to adjust to possible deformations of the centre sheet. The side of cover 72 facing the plate 73 or second top surface is disposed along a radius of shaft 58 and its edge is perpendicular to the centre surface or wall.

At each of its ends, cover 72 has two radial fingers 74 which reach to the edge of the bucket in order to stir the powdered product.

Hub 69 carries a radial arm 75 which comes down close to centre surface 16, e.g. to 4 to 8 millimeters from the latter, with which it becomes parallel.

Radial arm 75 has at its end the inclined flexible plate 73 the free end of which 76 rubs on the centre surface to form a wedge and push the product under it, one of its ends fixed to arm 75 being above said surface.

Preferably, the free end 76 of said plate is longer than the end fixed to arm 75 which gives this plate an inclined underside 77 so that when said plate moves in an arc of a circle over the perforation, it completely covers said perforation.

Arm 24 and its plate 73 are driven in an alternating movement by two fingers 78 and 79 fixed on hub 60 and angularly staggered. A rotary alternating movement the amplitude of which may be about 120 degrees is imparted to the unit made up of the two hubs 59 and 60. This alternating movement can be imparted by a controlled finger, as described above, which fits into the notch 80 formed on the perimeter of hub 59 (FIG. 4) and a centring finger can penetrate into a hollow in the base of shaft 58.

Figure 18:
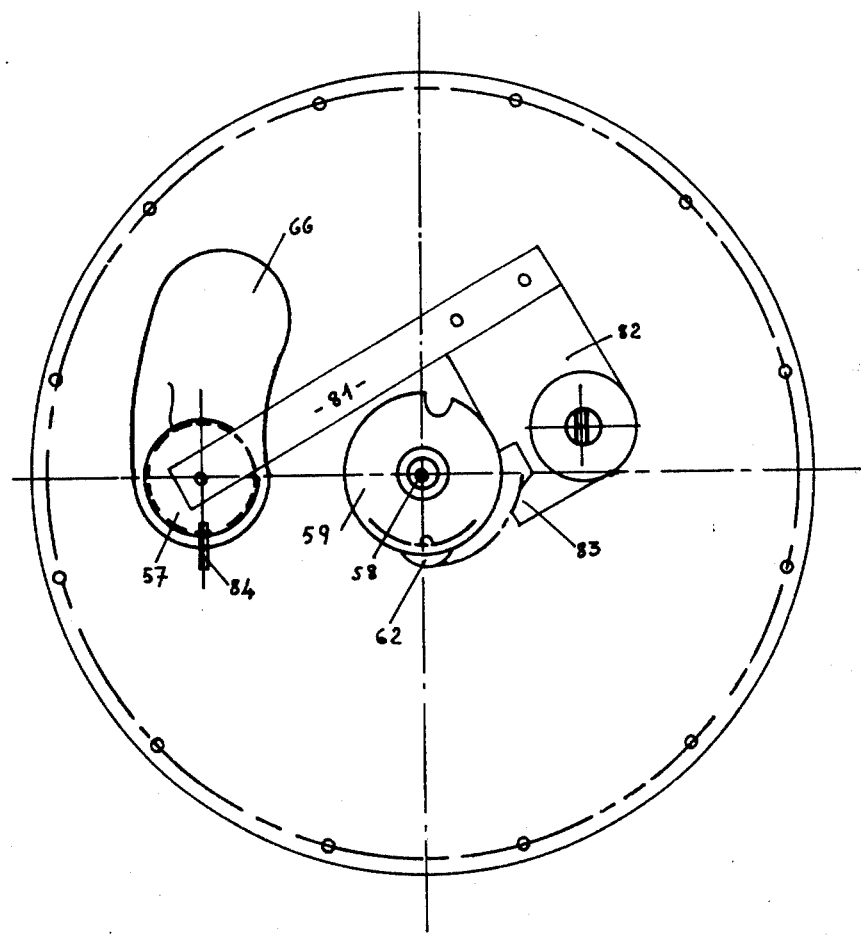

Under the centre surface in recess 56 in the plate there is a mobile bottom surface or cover 57 (FIG. 18). Cover 57 is carried by an arm 81 made of a flexible material which presses it against the centre plate.

Arm 81 is fixed at right angles to a plate 82 rotating around an axis fixed to plate 55.

Plate 82 has a cam 83 which, when hub 59 rotates, is acted upon by ball bearing 62 which has the effect of imparting an alternating rotary movement to unit 80-81-82 so that cover 57 closes perforation 54 and keeps it closed during filling before moving away in a movement in the opposite direction to that of top cover 72.

The working of the device according to the invention is as follows.

The bucket having previously been filled with the powdered product to be measured out and extracted:

Hub 59 is driven in a rotary movement by the finger cooperating with its notch 80; finger 61 transmits this movement to top hub 60.

Stud 78 carried by the hub pushes plate 73 towards perforation 54.

During this movement plate 73 carries along a volume of powdered product on to said perforation 54, its free end 76 scraping centre surface 16 which ensures that a volume of product is picked up even when the bucket is nearly empty, due to the slant of plate 73 the product infiltrates under it, which, when the volume of product is large, has a tendency to feather the flexible plate, its end 76 being lifted by the volume of product. During this movement, arms 70 are driven and stir the product while cover 72 applied by pressure arms 71 moves away following the same movement as perforation 54, said perforation occupying an intermediate position between plate 73 and cover 72.

During this movement, bottom cover 57 is applied against perforation 54, which is blocked.

Hub 60 is then operated in the reverse direction and it carries cover 72 along towards plate 73 fixed on perforation 54 where it holds a volume of powdered product which fits plate 73 and cover 72 closely together which helps to continue bringing well-compacted powder on to perforation 54 and hold it there while cover 72 penetrates under plate 73 until stud 79 bears on arm 75 carrying said plate in order to push it back.

Preferably the position of stud 79 in relation to the end of cover 72 is such that the latter only pushes plate 73 back when cover 72 has covered perforation 54, compacting the powdered product in said perforation. At the end of this movement the ball bearing 62 fixed on the contour of hub 59 rotates cam 83 on plate 82 around its axis, which drives bottom cover 57 in a rotary movement taking it away from perforation 54 in a movement antagonistic to that of top cover 72 under plate 73. The relative movements in opposite directions of cover 72 and cover 57 have the advantage on the one hand of scraping above and below said perforation and in particular of ensuring good extraction of the powdered product by preventing it, under the pressure exerted by one or other movement of said covers, from clogging against one or other edge of the perforation, which ensures perfect extraction and constantly uniform measurement. Preferably, in order to prevent the pressure exerted by cover 72 on the product contained in perforation 54 from pushing away the bottom cover, the latter, when it is stopped and blocking said perforation, cooperates with a bolt 84.

After extraction as described, hubs 59 and 60 are operated in the opposite direction, which has the effect of blocking the perforation with cover 57 and driving plate 72.

Figure 19:
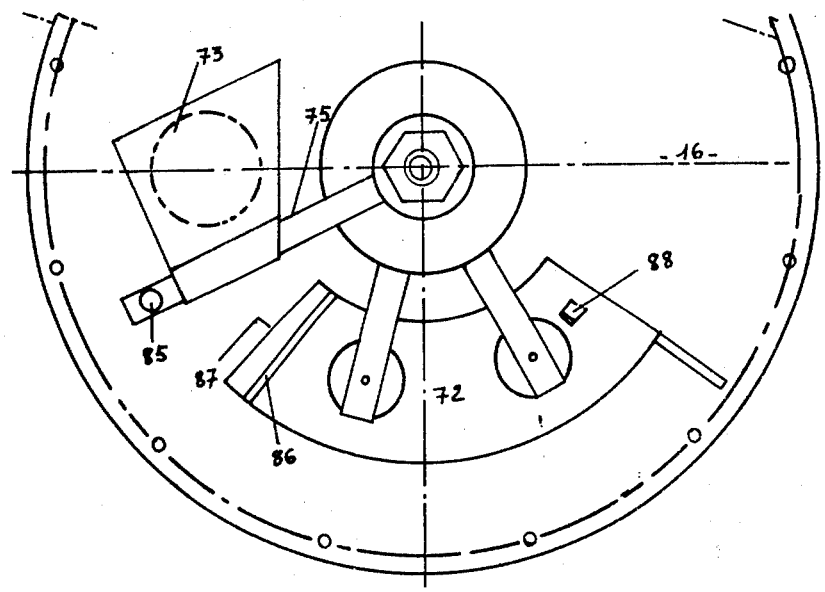
Figure 20:
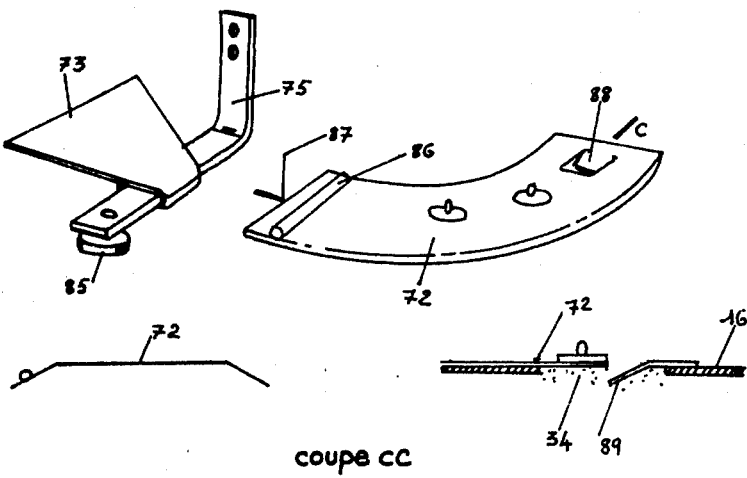
Figure 21:
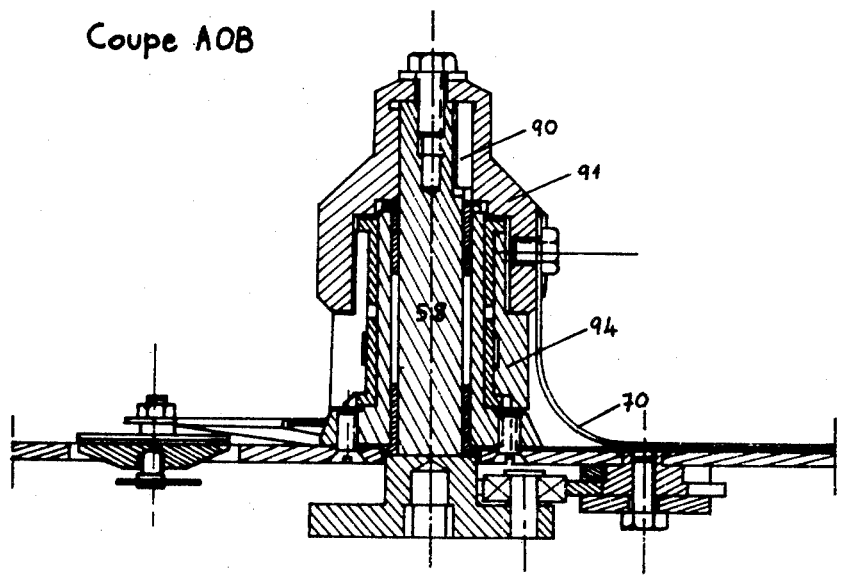

According to a preferred form of improved embodiment of the device according to the invention as shown in FIGS. 19 and 20, arm 75 holding plate 73 is a flexible arm folded at an angle of more than 90° and of which the end projecting beyond the plate carries a stud 85 which, because of the fold in said arm, presses fairly hard on the centre sheet or wall 16 in order, on the one hand, to create friction so that plate 73 does not move backwards too easily and provides real compression of the powdered product.

Top cover 72 is fitted close to its front edge which penetrates under the plate and staggered in relation thereto, e.g. at a distance of 5 millimeters, with a transversal step 86 which can be a welded metal wire and whose purpose is firmly to compact a lump of powdered product under the plate and in hole 54, at the same time preparing firm compression for the following cycle since said step 86 detaches the powder stuck under the plate while the front edge 87 of the cover, preferably made of thin sheet, which can e.g. be 2/10°, causes said powdered product to fall under said cover into the perforation.

Figure 6:
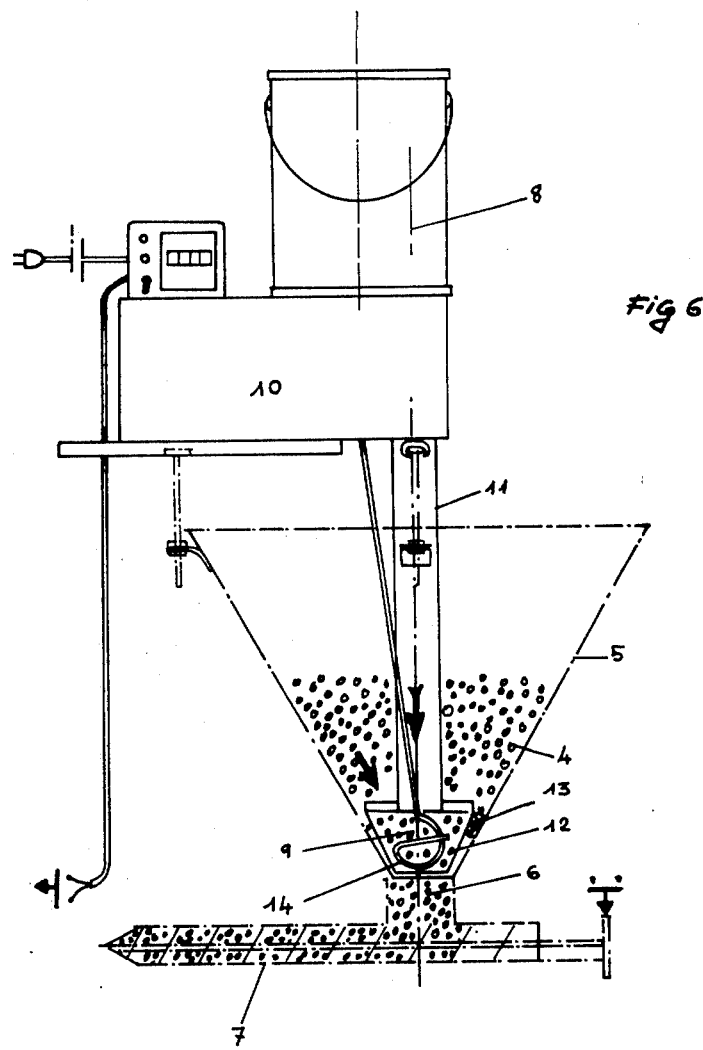
FIGS. 7 and 6 show sectional views of an installation for measuring out and adding a product according to the method which is the subject matter of the invention.

In order also to obtain good compression of the powdered product and good extraction thereof, the top cover is made of thin sheet which is cambered before assembly (FIG. 6B) and which is applied to the centre surface by pressure from the supporting arms, which creates slight pressure at the two ends of cover 72, said pressure preventing infiltrations of powdered product and allowing better scraping of the compressed product in the perforation. For this purpose and essentially in order to obtain better extraction of the compressed product in the perforation, top cover 72 has a protrusion or extrusion 88 formed by punching on the rear in the opposite direction to the direction of advance of the cover in said perforation 54 and which has an edge 89 projecting into said perforation to detach the tablet of compressed powder from it and a backward-slanting part which retracts when returning backwards.

Figure 22:
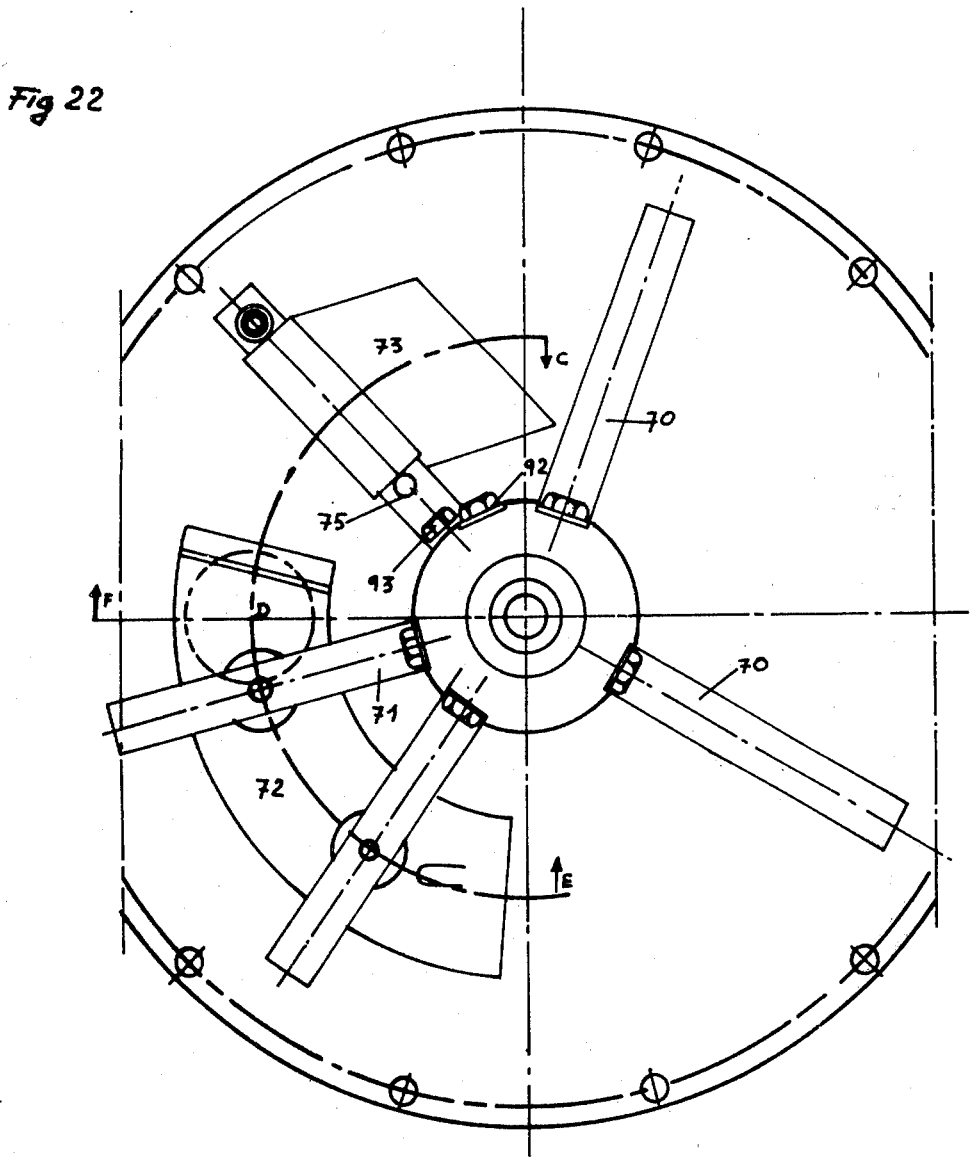
Figure 23:
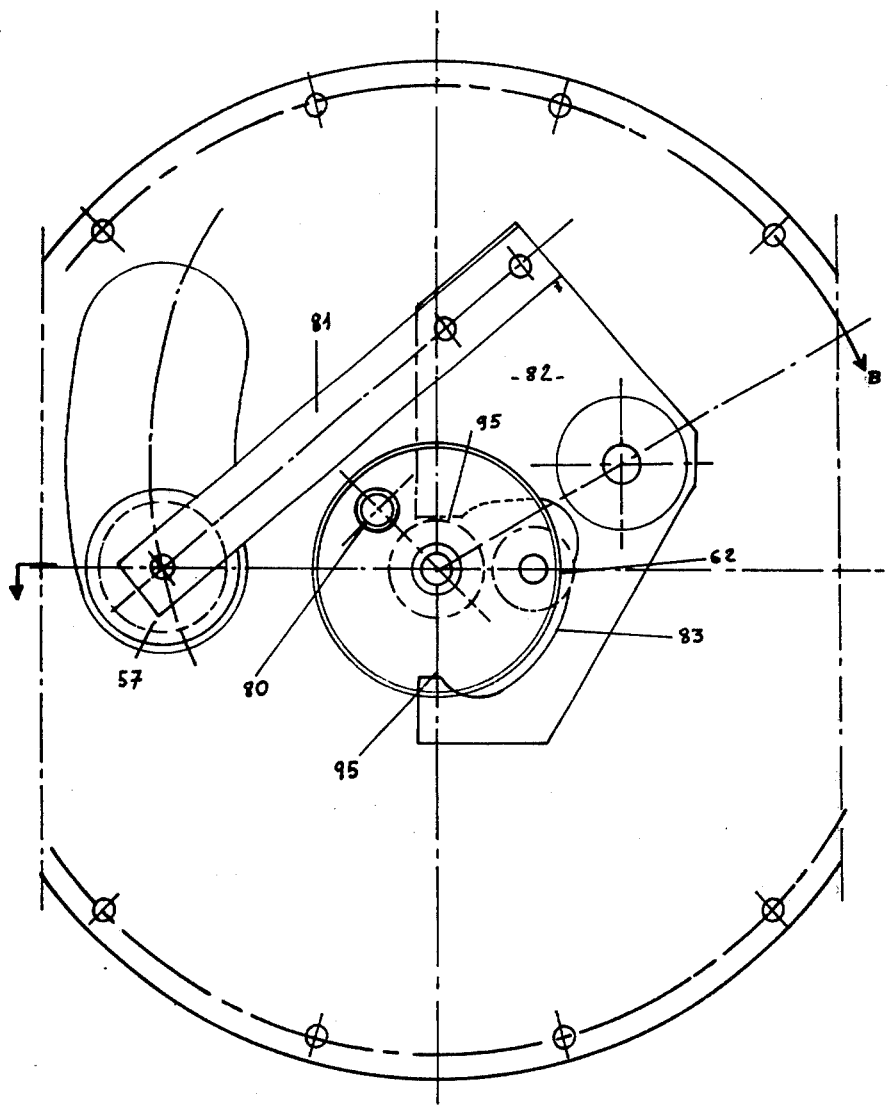

FIGS. 22, 22 and 23 show an improved form of the product measuring and extraction device of the type described above and shown in FIGS. 15 to 20.

In this form of embodiment, an alternating movement is imparted to shaft 58 as described above. A pin 90 transmits this movement to a top hub 91 fixed at the top of said shaft and rotating on a ring which shall preferably be a ring made of porous, oil-impregnated sintered metal. A vertical bar 92, integral with hub 91 and the first of the pressure arms 71 to which cover 72 is fixed cooperate with the projecting head of screw 93 which fixes pressure arm 75 carrying plate 73 to bottom hub 94 in order to transmit the movement of the top hub to the bottom hub, drive said plate and make it go towards or withdraw from the hole.

As described above the arm carrying the plate is equipped with a stud 85 rubbing on the centre surface, which puts some pressure on cover 72 to push plate 73 and thus contributes to good compacting of the product in the hole in the centre surface.

The scraper arms are fixed by screws directly on to the top hub.

Cam 83 integral with rotary plate 82 under the centre surface is articulated under the bottom plate between two sintered metal washers. Its profile is such that the bearing component 62 cannot deflect by more than the amplitude required to move bottom cover 57 and it is fitted with two stops 95 which bear against the drive shaft at the end of each stroke so that it is impossible to have both covers simultaneously withdrawn from the centre perforation during any given operation.

Figure 24:
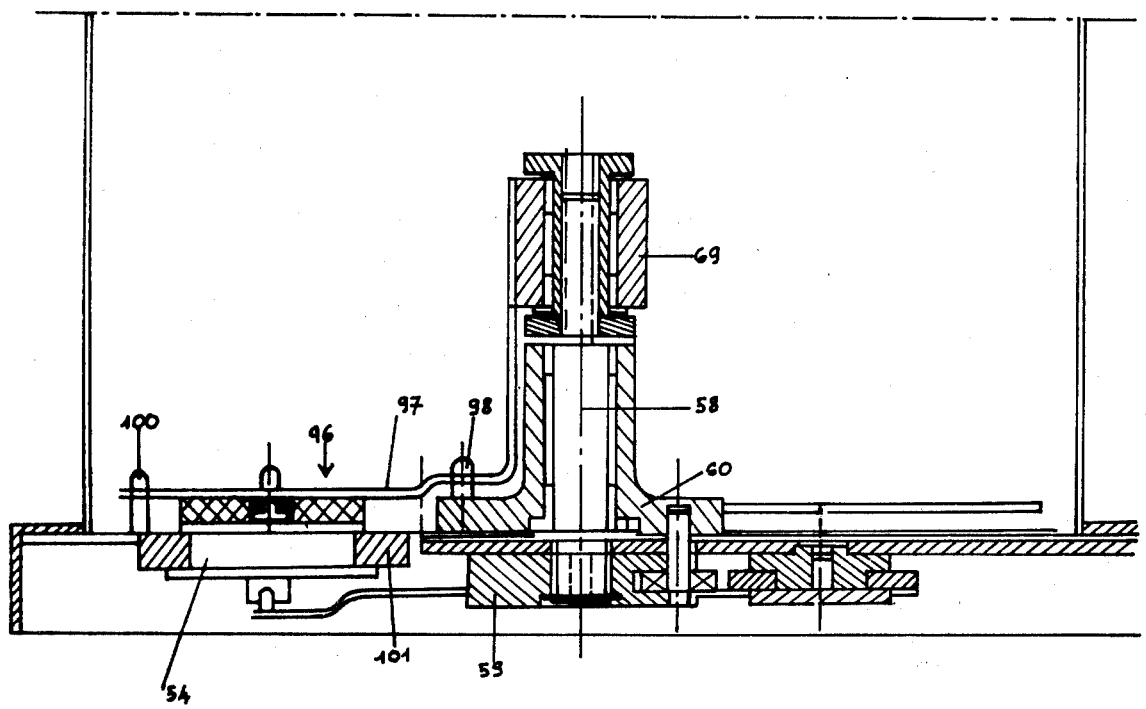
Figure 25:
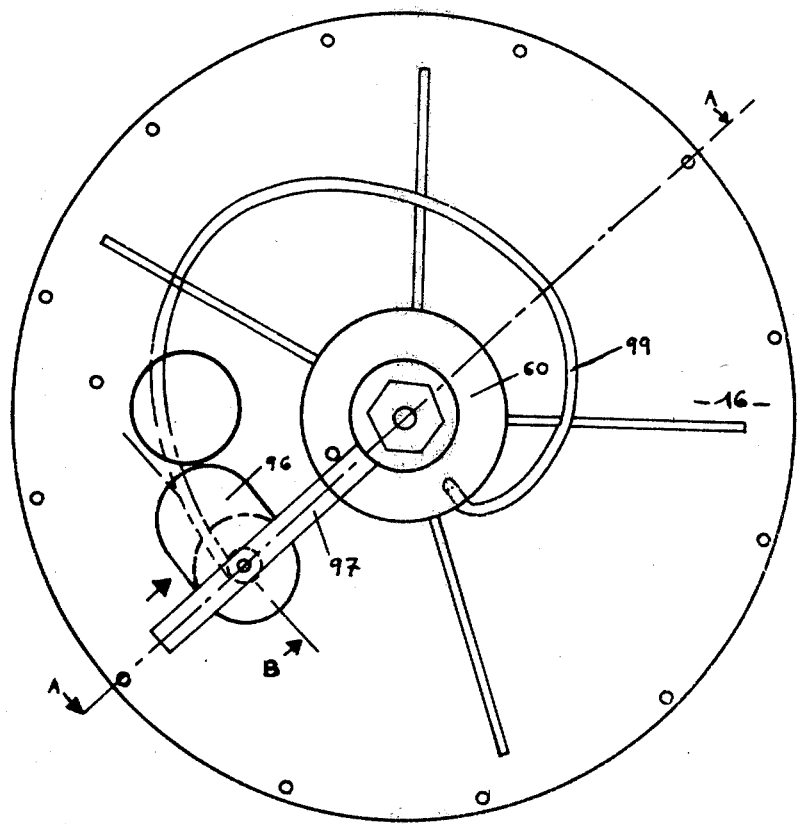
Figure 26:
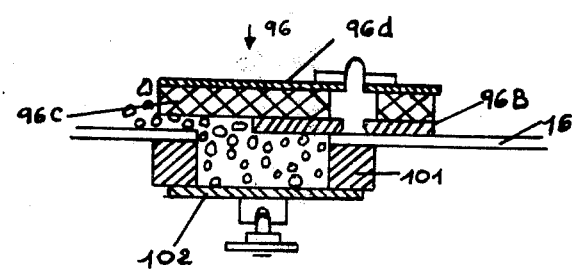

According to another form of embodiment as shown in FIGS. 24 to 26, particularly well suited to the measurement and extraction of granular products, the extractor device comprises a centre surface 16. A top surface or cover 96 is carried by a flexible arm 97 integral with a hub 69 rotating freely on shaft 58 with a frontback rotary movement fitted with a stud 98 and controlled by bottom hub 59.

A spiral spring 99 fixed to top hub 60 and to arm 97 closes said cover 96 over hole 54 until pressure arm 97 is pressed against a stop 100 integral with centre surface 16.

Top cover 96 consists of a metal part 96B, preferably circular, which rubs on the centre surface equipped with a flap 96C made of flexible material held by a top metal plate 96D.

Preferably, parts 96B and 96D are fixed together by means of a rivet with a shoulder to prevent any gap between the parts.

The surface of flap 96C formed by superimposing a flexible material, e.g. foam rubber, on the plate and top metal plate 96D which can be glued together is larger than that of part 96C and offset in relation to the latter so that it projects on one side in order to close the perforation in case piled-up granules have jammed the cover.

Under the centre surface there is a raising block 101 in the shape of an arc of a circle which has a perforation aligned with that in the centre plate and of the same diameter.

Under the raising block on the centre plate there is a bottom surface or stopper 102 carried by a flexible arm or operated by a cam in relation to the bottom hub, as in the form of embodiment previously described.

The top hub is equipped with angularly spaced radial arms whose purpose is to bring the product towards the perforation.

The device in accordance with the invention works as follows:

Hub 60, alternatingly rotated as previously described, operates cover 96 via spring 93 which presses said cover against the centre surface to cover the perforation, keeping excess granules away from the latter until pressure arm 97 of said cover comes against end-of-stroke stop 100 integral with the centre surface. Bottom cover 102 is then operated to open the perforation and the dose of granules is extracted by gravity.

If, during the return of cover 96, granules should pile up between the bottom cover and the perforation, preventing the latter from fulfilling its purpose, flap 96C made of flexible material, whose length beyond said cover is substantially equal to the diameter of said perforation, will pass over the excess granules through the perforation during opening of the bottom cover and band spring 99 will pull the cover over the perforation.

After bottom cover 102 has been opened, stud 98 will withdraw arm 97 in order to begin a new cycle.

FIGS. 27 to 33 show simplified forms of embodiment of the device for extracting and measuring out products from a bulk stock according to the invention.

FIGS. 27 and 28 are a sectional view and a view from above of a device wherein the three plates, the top plate 103, the centre plate 104 and the bottom plate 105, are circular.

Centre plate 104 is held still between flanges tightened with screws. Plates 103 and 105, whose diameter is smaller than that of plate 104, fit into hollows formed in the flanges whose dimensions are such that they allow plates 103 and 105 to rotate freely in relation 104 while preventing them from moving away upwards or downwards. The three plates are mounted on a common geometric axis by a hub in two parts 106 and 107 held together by a screw. Two pins 108 are sandwiched and embedded in the parts of the hub.

Passing through the holes 109 in plate 103 (FIG. 28) they fix the latter to the hub. Passing through the oblong apertures 111 and 110 in plates 104 and 105, they make it possible to control the amplitude of the movements of plate 103 in relation to plate 104 and of plate 103 in relation to plate 105. At the bottom, the hub can take a control rod 112 welded on a plate, itself fixed to the hub 107 by a screw, not shown.

Control of 112 can be either manual or mechanised by a system which is not shown.

Control can also be effected by a control rod integral with the hub and going through the product upwards. The device is the type with three concentric holes 113 per plate. The length of the arc of a circle of the hole centres must be equal to at least four times the largest diameter, i.e. that of a hole in plate 105. The oblong aperture in plate 104, carefully calculated, will allow an impact at the end of each movement, which again helps to circulate clogging products.

The arc of a circle length of the oblong aperture 111 in plate 105 is such that it allows plate 105 to move in relation to plate 103 by the angular value covered by a hole in plate 105. The view from above, FIG. 7, shows the respective positions of the holes in the plates and the oblong apertures.

A to-and-fro movement between the stops on handle 17 puts the device into operation according to the method previously described.

Figure 29:
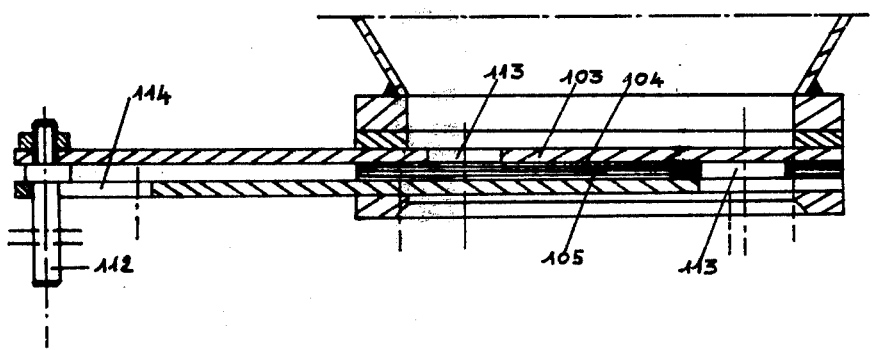

FIG. 29 shows another form of embodiment of the device. This has two holes, with the peculiarity that the bottom plate 105 has no holes, since the rectilinear movements of the plates allow final ejection to be made at the end of bottom plate 105.

As before, the plates are mounted between two flanges and held by screws, not shown, and the unit is mounted by means of screws underneath a hopper. The top plate comprises a control rod 112 which goes through an oblong aperture 114 in plate 105. This aperture allows plate 105 to be moved a distance equal to the diameter of a perforation in plate 104, in relation to plate 103.

As before, a manuel or mechanised to-and-fro movement puts the device into operation in accordance with the method described above.

Figure 30:
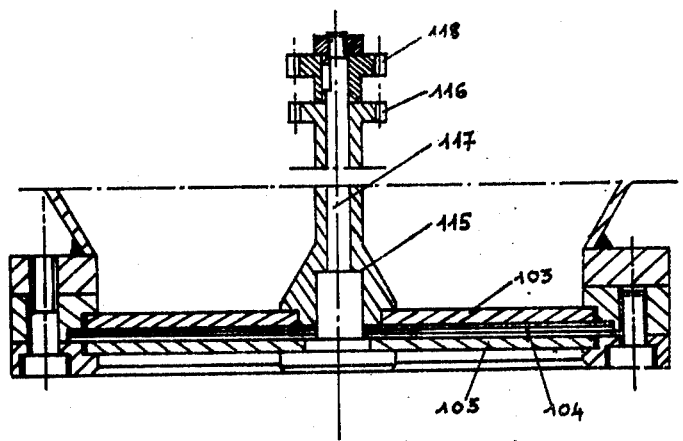
Figure 31:
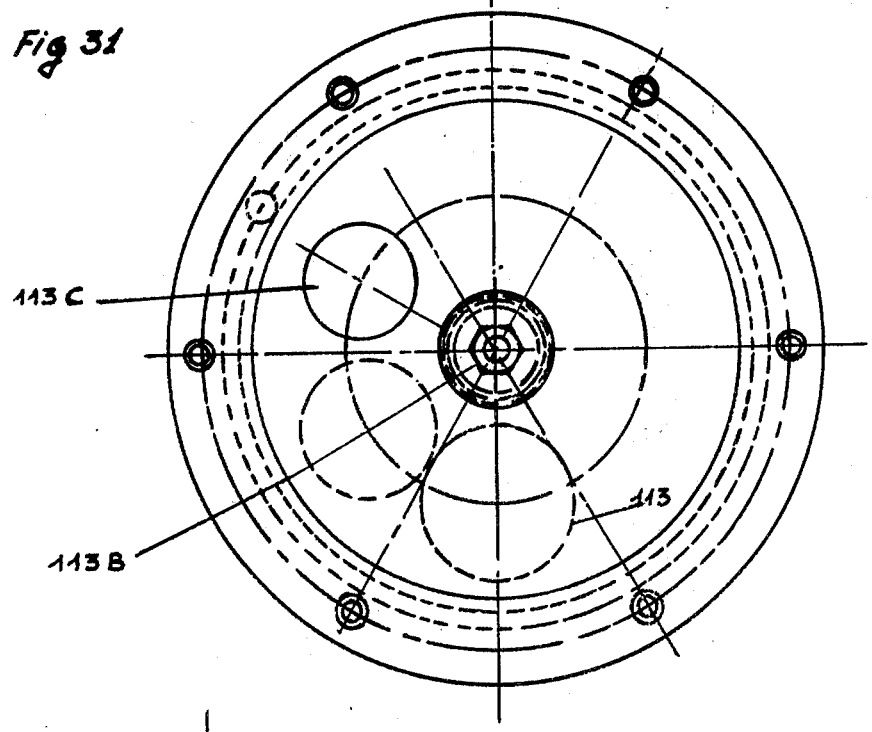

FIGS. 30 and 31 show another form of embodiment of the device. Here, the three plates, each with a single perforation in the example chosen, are continuously rotated one in relation to another around a common geometric axis. Centre plate 104 is held as before between the two flanges held together by screws.

Top plate 103 is continuously rotated by means of a hollow shaft 115 cooperating by drive square and by means of toothed wheel 116 in conjunction with a motor, not shown. Bottom plate 105 cooperates by drive square with shaft 117 integral with toothed wheel 118 driven by a known system, not shown, at a speed double that of plate 108, in the same direction.

In the initial conventional position shown in FIG. 31, the single hole 113 in plate 103 is inscribed in a 60° sector and holes 113B and 113C in plates 103 and 104 are each staggered by 60°.

Figure 31B:
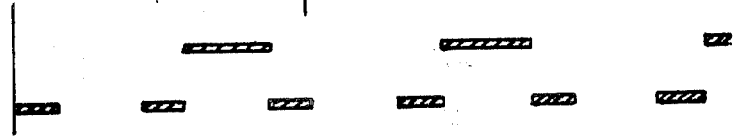

FIG. 31B shows in shaded outlines a diagram in terms of time of the periods when there is partial or total passage between holes 113B and 113C in plates 104 and 103 for the top line and between holes 113B and 113 in plates 104 and 105 for the bottom line. It can be seen in this simple example of a hole in a 60° sector that there is never any direct passage, even partial, from 113C into 113 through hole 113B.

Here again, therefore, the device works like a lock-gate in accordance with the method described at the beginning.

Figure 32:
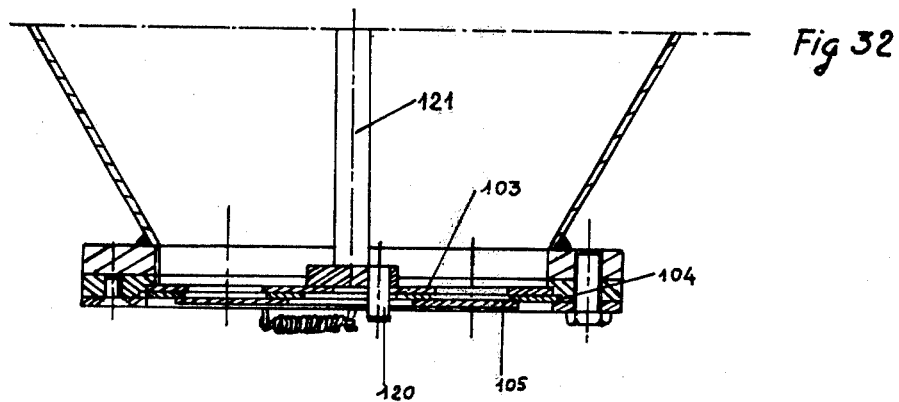
Figure 33:
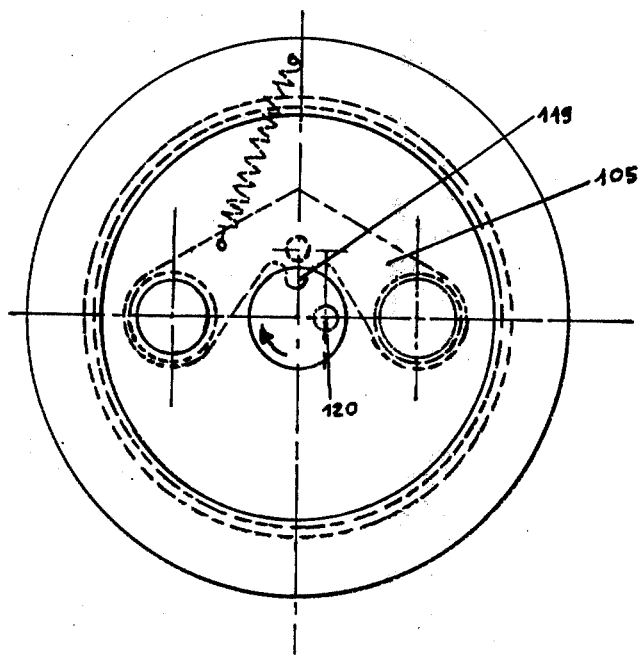

FIGS. 32 and 33 show a sectional view and a view from above of another form of embodiment.

In this example, the device has two holes in plates 103 and 104. Bottom plate 105 is a stopper in the shape of a butterfly whose projection 119 cooperates with the eccentric axle 120 integral with the shaft 121 which controls the continuous rotation of top plate 103.

It will be understood that at each revolution, stopper 105 is moved by the effect of 120 on 119 then brought back by the return spring.

It is also feasible, according to another form of embodiment of the invention as shown in FIGS. 32 and 33, for shaft 121 to carry two diametrically opposite eccentric axles which, at each rotation of the shaft, cooperate with the tooth 119 on the butterfly stopper, which enables two successive doses of product to be delivered at each rotation of plate 105.

The method according to the invention and the devices for implementing it, as described, are particularly applicable to distribution and measuring out, notably of powdered pigments. They can be rearranged and varied within the scope of the technical equivalents without thereby departing from this patent.

I claim:

1. A method of extracting and measuring out a first product and adding said product to a second product comprising:
    (a) pressing a small quantity of the first product into a top opening in a measuring space, while a bottom opening in said space is closed,
    (b) closing said top opening and opening said bottom opening whereby said small quantity of first product falls out of said space,
    (c) making a cavity in said second product adjacent an exit position for said second product,
    (d) feeding said quantity of said first product into said second product,
    (e) mixing said quantity of said first product with said second product in the cavity, and
    (f) feeding said mixed products out of said cavity.

2. A device for carrying out the method claimed in claim 1 comprising:
    (a) a first hopper to contain a first product,
    (b) a second hopper to contain a second product and having a delivery opening,
    (c) a distributor,
    (d) means for operating the distributor to cause portions of the first product to be fed successively to an outlet;

(e) a mixing chamber located in said second hopper near said delivery opening and arranged to receive portions of said second product,
(f) duct means in said second hopper for conveying said portions of the first product through the second product into said mixing chamber,
(g) means for mixing said products in said mixing chamber; and
(h) means for feeding the mixed products out of said mixing chamber.

3. A device according to claim 2 having a flange and means for supporting and rotating the flange above said mixing chamber, such as to provide a cavity over said mixing chamber, said duct being located so as to feed said portions of the first product into said cavity.

4. A device according to claim 2 wherein the distributor comprises a middle plate having a measuring hole therein, first and second top plates movable alternately over the hole in the middle plate, and a bottom plate; means to move the top plates alternately in the same direction as each other then one towards each other in the direction of the hole so as to assemble and compact a portion of the first product in the hole; and means to move the bottom plate to release said portion from the hole.

5. A device according to claim 4 wherein the top plates are angularly stagged on either side of said hole, said plates being moved one below the other when they move towards each other over the perforation.

6. A device according to claim 4 wherein one of the top plates is flexible and pivotally mounted on a support resiliently above the middle plate and it has a free end which rubs on the middle plate forming a wedge shape with the middle plate and the other top plate is pivotally mounted on resilient means in close contact with the middle plate and is arranged to slide below the first mentioned top plate to compact the product in the hole.

7. A device according to claim 4 wherein one of the top plates is flexible and pivotally mounted on a support resiliently above the middle plate and it has a free end which rubs on the middle plate forming a wedge shape with the middle plate and the other top plate is pivotally mounted on resilient means in close contact with the middle plate and is arranged to slide below the first mentioned top plate to compact the product in the hole, and a step is provided on the second top plate near to but spaced from its front edge on the upper side thereof arranged to compact a portion of the first product to be fed to the hole on the next operation of the device, and a projection is also provided on the upper side of the second top plate which projection is arranged to enter the hole to assist in detaching the product therein.

8. A device according to claim 4 wherein the middle plate is a fixed rigid plate.

9. A device as claimed in claim 4 wherein one of the top plates is flexible, said device having a flexible supporting arm which carries the pivotally mounted flexible top plate.

10. A device according to claim 4 having a flexible arm that supports the bottom plate and a member under the bottom plate to compensate for the pressure of the top plates.

11. A device according to claim 4 having a collar surrounding the hole below the middle plate, a flexible member adapted to cover the opening in the collar, and a flexible member carried by one of the top plates is arranged to close the hole in the middle plate should this top plate become jammed by the product.

12. A device according to claim 2 wherein the distributor comprises a middle plate having a measuring hole therein, a top plate, and a bottom plate, said top and bottom plates having openings therein corresponding to said measuring hole, means to move said top and bottom plates so as to close and open the hole alternately, said means contacting the top plate and bottom plate simultaneously in one direction until the opening in the bottom plate coincides with said hole, whereupon the top and bottom plates are moved in the opposite direction until the bottom plate closes said hole and the opening in the top plate coincides with said hole.

13. A device according to claim 12 wherein said means to move the top and bottom plates includes a lost motion whereby only part of the movement of the top plate is imparted to the bottom plate, said middle plate being fixed.

14. A device according to claim 12 wherein said means to move the top and bottom plates includes a pin which enters apertures in all three plates, the aperture in the middle plate giving free movement to the axle, and the apertures in the top and bottom plates being of different size such that the pin has a lost motion connection with the bottom plate to move this a less distance than the top plate.

15. A device according to claim 12 wherein the top plate is continuously rotated over the middle plate and the bottom plate has an alternating movement, the top and bottom plates being operated by connections to a common rotary shaft.

* * * * *